US012142412B2

(12) United States Patent
Luo et al.

(10) Patent No.: US 12,142,412 B2
(45) **Date of Patent: *Nov. 12, 2024**

(54) INDUCTOR DEVICE

(71) Applicant: Realtek Semiconductor Corporation, Hsinchu (TW)

(72) Inventors: Cheng-Wei Luo, Hsinchu (TW); Chieh-Pin Chang, Hsinchu (TW); Kai-Yi Huang, Taipei (TW); Ta-Hsun Yeh, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 928 days.

This patent is subject to a terminal disclaimer.

(21) Appl. No.: 17/023,678

(22) Filed: Sep. 17, 2020

(65) Prior Publication Data

US 2021/0090782 A1 Mar. 25, 2021

(30) Foreign Application Priority Data

Sep. 25, 2019 (TW) ................................ 108134712

(51) Int. Cl.
*H01F 27/28* (2006.01)

(52) U.S. Cl.
CPC . *H01F 27/2804* (2013.01); *H01F 2027/2809* (2013.01)

(58) Field of Classification Search
CPC ......... H01F 27/2804; H01F 2027/2809; H01F 17/0013; H01F 17/0006; H01F 5/003
USPC .................................................. 336/200, 232
See application file for complete search history.

(56) References Cited

U.S. PATENT DOCUMENTS

| | | | | |
|---|---|---|---|---|
| 10,978,547 | B2 | 4/2021 | Yen et al. | |
| 2011/0032067 | A1 | 2/2011 | Guillou et al. | |
| 2012/0044034 | A1 | 2/2012 | Nazarian et al. | |
| 2012/0242406 | A1* | 9/2012 | Ke ...................... | H01F 27/2804 330/195 |
| 2014/0266542 | A1 | 9/2014 | Yu et al. | |
| 2016/0225509 | A1* | 8/2016 | Mattsson ............ | H01F 27/2804 |

(Continued)

FOREIGN PATENT DOCUMENTS

| | | |
|---|---|---|
| TW | M483535 U | 8/2014 |
| TW | 201714278 A | 4/2017 |

(Continued)

OTHER PUBLICATIONS

China Patent Office, the office action of the corresponding Chinese application No. 201910945040.6 dated 1 Aug. 3, 2021.

*Primary Examiner* — Tszfung J Chan
(74) *Attorney, Agent, or Firm* — Locke Lord LLP; Tim Tingkang Xia, Esq.

(57) ABSTRACT

An inductor device includes a first coil and a second coil. The first coil includes a first connection member and a plurality of first circles. At least two first circles of the first circles are located at a first area, and half of the first circle of the first circles is located at a second area. The second coil includes a second connection member and a plurality of second circles. At least two second circles of the second circles are located at the second area, and half of the second circle of the second circles is located at the first area. The first connection member is coupled to the at least two first circles and the half of the first circle. The second connection member is coupled to the at least two second circles and the half of the second circle.

14 Claims, 6 Drawing Sheets

(56) References Cited

U.S. PATENT DOCUMENTS

| | | | | |
|---|---|---|---|---|
| 2017/0012601 | A1* | 1/2017 | Yen | H01L 23/5227 |
| 2017/0098500 | A1* | 4/2017 | Yen | H01F 27/29 |
| 2017/0200547 | A1 | 7/2017 | Yen et al. | |
| 2017/0287618 | A1* | 10/2017 | Knopik | H01Q 1/50 |
| 2018/0040412 | A1* | 2/2018 | Yen | H01F 17/0006 |
| 2018/0330872 | A1 | 11/2018 | Yen et al. | |
| 2019/0148479 | A1 | 5/2019 | Yen et al. | |

FOREIGN PATENT DOCUMENTS

| | | | | |
|---|---|---|---|---|
| TW | 598899 | B1 * | 9/2017 | H01F 17/0006 |
| TW | I598899 | B | 9/2017 | |
| TW | 643216 | B1 * | 12/2018 | H01F 17/0006 |
| TW | 201919074 | A | 5/2019 | |

* cited by examiner

INDUCTOR DEVICE

RELATED APPLICATIONS

This application claims priority to Taiwan Application Serial Number 108134712, filed Sep. 25, 2019, which is herein incorporated by reference.

BACKGROUND

Field of Invention

The present disclosure relates to an electronic device. More particularly, the present disclosure relates to an inductor device.

Description of Related Art

In the prior art, the winding method of an eight-shaped inductor device causes a large amount of parasitic capacitance between the coils in the inductor device. As a result, the quality factor (Q) of the inductor device is seriously affected.

For the foregoing reason, there is a need to solve the above-mentioned problem by providing an inductor device.

SUMMARY

The foregoing presents a simplified summary of the disclosure in order to provide a basic understanding to the reader. This summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

One objective of the present disclosure is to provide an inductor device to resolve the problem of the prior art. The means of solution are described as follows.

One aspect of the present disclosure is to provide an inductor device. The inductor device comprises a first coil and a second coil. The first coil comprises a first connection member and a plurality of first circles. At least two first circles of the first circles are located at a first area, and half of the first circle of the first circles is located at a second area. The second coil comprises a second connection member and a plurality of second circles. At least two second circles of the second circles are located at the second area, and half of the second circle of the second circles is located at the first area. The first connection member is coupled to the at least two first circles and the half of the first circle. The second connection member is coupled to the at least two second circles and the half of the second circle.

Therefore, based on the technical content of the present disclosure, the inductor device according to the embodiments of the present disclosure can effectively reduce the parasitic capacitance between the coils of the inductor device so as to allow the inductor device to have a better quality factor (Q). In addition, the frequency where the self-resonant frequency (Fsr) of the inductor device occurs is effectively improved to move the frequency where the self-resonant frequency occurs to a higher frequency, thus reducing the influence on the quality factor.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

According to the usual mode of operation, various features and elements in the figures have not been drawn to scale, which are drawn to the best way to present specific features and elements related to the disclosure. In addition, among the different figures, the same or similar element symbols refer to similar elements/components.

DESCRIPTION OF THE EMBODIMENTS

To make the contents of the present disclosure more thorough and complete, the following illustrative description is given with regard to the implementation aspects and embodiments of the present disclosure, which is not intended to limit the scope of the present disclosure. The features of the embodiments and the steps of the method and their sequences that constitute and implement the embodiments are described. However, other embodiments may be used to achieve the same or equivalent functions and step sequences.

Unless otherwise defined herein, scientific and technical terminologies employed in the present disclosure shall have the meanings that are commonly understood and used by one of ordinary skill in the art. Unless otherwise required by context, it will be understood that singular terms shall include plural forms of the same and plural terms shall include the singular. Specifically, as used herein and in the claims, the singular forms "a" and "an" include the plural reference unless the context clearly indicates otherwise.

Figure 1:
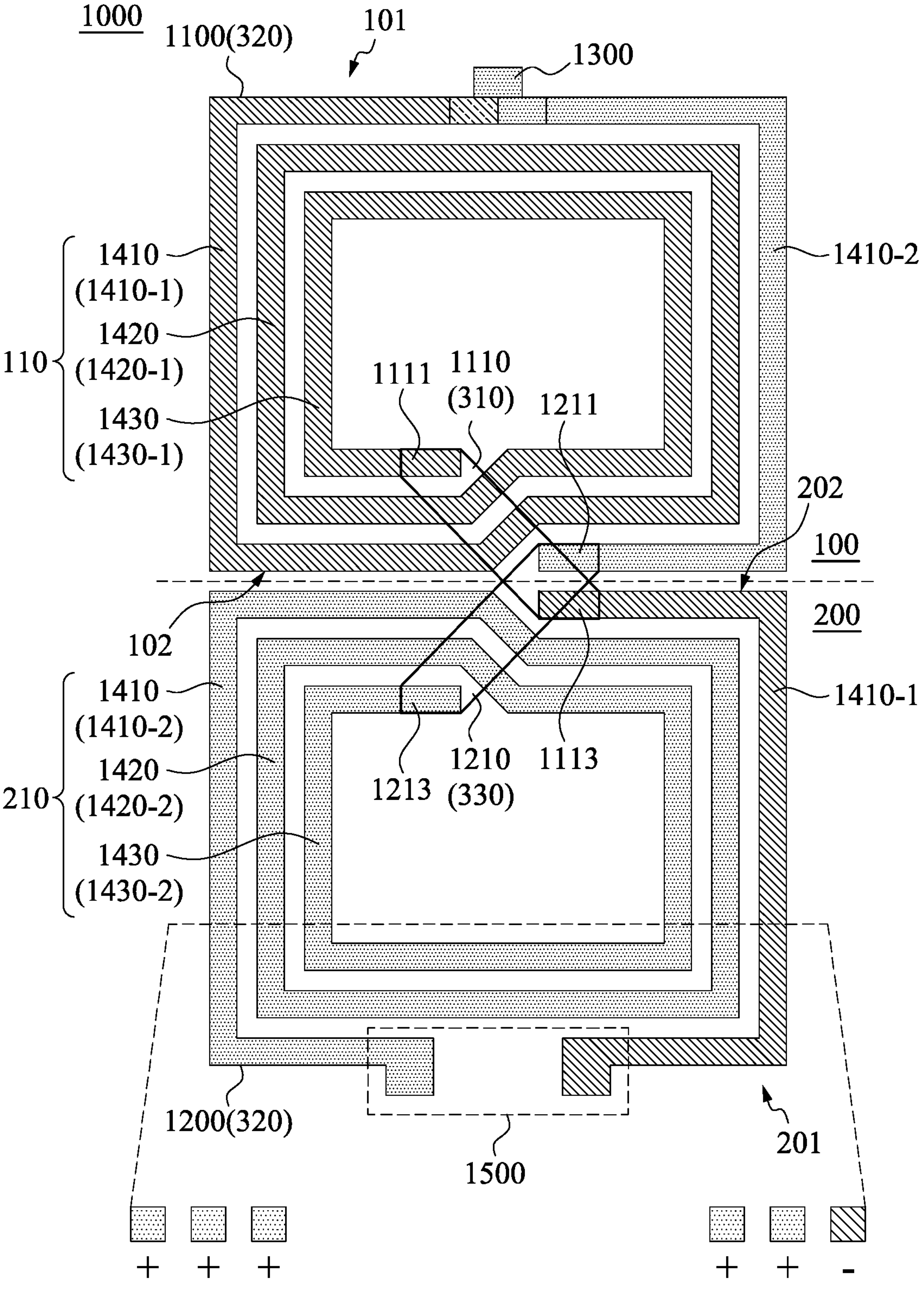
FIG. 1 depicts a schematic diagram of an inductor device according to one embodiment of the present disclosure.

FIG. 1 depicts a schematic diagram of an inductor device 1000 according to one embodiment of the present disclosure. As shown in the figure, the inductor device 1000 includes a first coil 1100 and a second coil 1200. The first coil 1100 is wound into a plurality of first circles 110. In addition, the second coil 1200 is wound into a plurality of second circles 210. The first coil 1100 includes a first connection member 1110, and the second coil 1200 includes a second connection member 1210.

As for the structure, at least two first circles of the first circles 110 are located at a first area 100 (such as an upper half area in the figure). Half of the first circle of the first circles 100 is located at a second area 210 (such as a lower half area in the figure). In other words, most of the circles in the first circles 110 of the first coil 1100 are located at the first area 100. Additionally, at least two second circles of the second circles 210 are located at the second area 200 (such as the lower half area in the figure). Half of the second circle of the second circles 210 is located at the first area 100 (such as the upper half area in the figure). In other words, most of the circles in the second circles 210 of the second coil 1200 are located at the second area 200. The first connection member 1110 is coupled to the at least two first circles located at the first area 100 and the half of the first circle located at the second area 200 among the first circles 110. In addition to that, the second connection member 1210 is coupled to the at least two second circles located at the second area 200 and the half of the second circle located at the first area 100 among the second circles 210. In greater detail, the first connection member 1110 is coupled to the first circle on an innermost side among the first circles 110 that are located at the first area 100 and the first circle on an outermost side among the first circles 110 that are located at the second area 200. For example, the first connection member 1110 is coupled to a connection point 1111 of the first circle (1430-1) that is located at the first area 100 and on the innermost side among the first circles 110 and a connection point 1113 of the first circle (1410-1) that is located at the second area 200 and on the outermost side among the first circles 110. In addition, the second connection member 1210 is coupled to the second circle on an outermost side among the second circles 210 that are located at the first area 100 and the second circle on an innermost side among the second circles 210 that are located at the second area 200. For example, the second connection member 1210 is coupled to a connection point 1211 of the second circle (1410-2) that is located at the first area 100 and on the outermost side among the second circles 210 and a connection point 1213 of the second circle (1430-2) that is located at the second area 200 and on the innermost side among the second circles_210. In one embodiment, the above first connection member 1110 and second connection member 1210 can be coupled to the connection points 1111, 1113, 1211, 1213 correspondingly through vias.

In one embodiment, part of the first connection member 1110 and part of the second connection member 1210 overlap. In another embodiment, the first connection member 1110 and the second connection member 1210 are located on different layers. However, the present disclosure is not limited to the above embodiment. In some embodiments, the first connection member 1110 and the second connection member 1210 may be located on a same layer depending on practical needs.

In another embodiment, the first coil 1100 and the second coil 1200 are located on a same layer. Additionally, the first connection member 1110, the first and second coils 1100, 1200, and the second connection member 1210 are respectively located on a first layer 310, a second layer 320, and a third layer 330. In addition to that, the first layer 310, the second layer 320, and the third layer 330 are sequentially stacked. In other words, the first connection member 1110 is located on an uppermost layer, the first and second coils 1100, 1200 are located on a middle layer, and the second connection member 1210 is located on a lowermost layer. However, the present disclosure is not limited to the above embodiment. In some embodiments, the first connection member 1110, the second connection member 1210, and the first and second coils 1100, 1200 are respectively located on the first layer 310, the second layer 320, and the third layer 330. In other words, the first connection member 1110 is located on the uppermost layer, the second connection member 1210 is located on the middle layer, and the first and second coils 1100, 1200 are located on the lowermost layer depending on practical needs. In some embodiments, part of the first connection member 1110 and part of the second connection member 1210 overlap the first and second coils 1100, 1200.

In one embodiment, the first coil 1100 and the second coil 1200 are collectively wound into a first turn 1410 (1410-1, 1410-2), a second turn 1420 (1420-1, 1420-2), and a third turn 1430 (1430-1, 1430-2). The first turn 1410 (1410-1, 1410-2), the second turn 1420 (1420-1, 14120-2), and the third turn 1430 (1430-1, 1430-2) are sequentially arranged from an outside to an inside. The first coil 1100 is wound counterclockwise from a first side 101 (such as a center-tapped terminal 1300 on an upper side) of the first area 100 to a second side 102 (such as a lower side) of the first area 100 along the first turn 1410-1, and is wound to the second turn 1420-1 on the second side 102 of the first area 100. The first coil 1100 is then wound from the second side 102 of the first area 100 to the second side 102 of the first area 100 along the second turn 1420-1, and is wound to the third turn 1430-1 on the second side 102 of the first area 100. After that, the first coil 1100 is wound from the second side 102 of the first area 100 to the second side 102 of the first area 100 along the third turn 1430-1, and is coupled to the first turn 1410-1 of the first coil 1100 located at the second area 200 through the first connection member 1110. In addition, the first coil 1100 is wound from a second side 202 (such as the connection point 1113 on an upper side) of the second area 200 to a first side 201 (such as a lower side) of the second area 200 along the first turn 1410-1.

Additionally, the second coil 1200 is wound clockwise from the first side 201 (such as an input terminal 1500 on the lower side) of the second area 200 to the second side 202 (such as the upper side) of the second area 200 along the first turn 1410-2, and is wound to the second turn 1420-2 on the second side 202 of the second area 200. The second coil 1200 is then wound from the second side 202 of the second area 200 to the second side 202 of the second area 200 along the second turn 1420-2, and is wound to the third turn 1430-2 on the second side 202 of the second area 200. After that, the second coil 1200 is wound from the second side 202 of the second area 200 to the second side 202 of the second area 200 along the third turn 1430-2, and is coupled to the first turn 1410-2 of the second coil 1200 located at the first area 100 through the second connection member 1210. Additionally, the second coil 1200 is wound from the second side 102 (such as the connection point 1211 on the lower side) of the first area 100 to the first side 101 (such as the center-tapped terminal 1300 on the upper side) of the first area 100 along the first turn 1410-2. However, the present disclosure is not limited to the structure shown in FIG. 1, which is merely used to illustrate one of the implementation methods of the present disclosure by taking an example.

Figure 2:
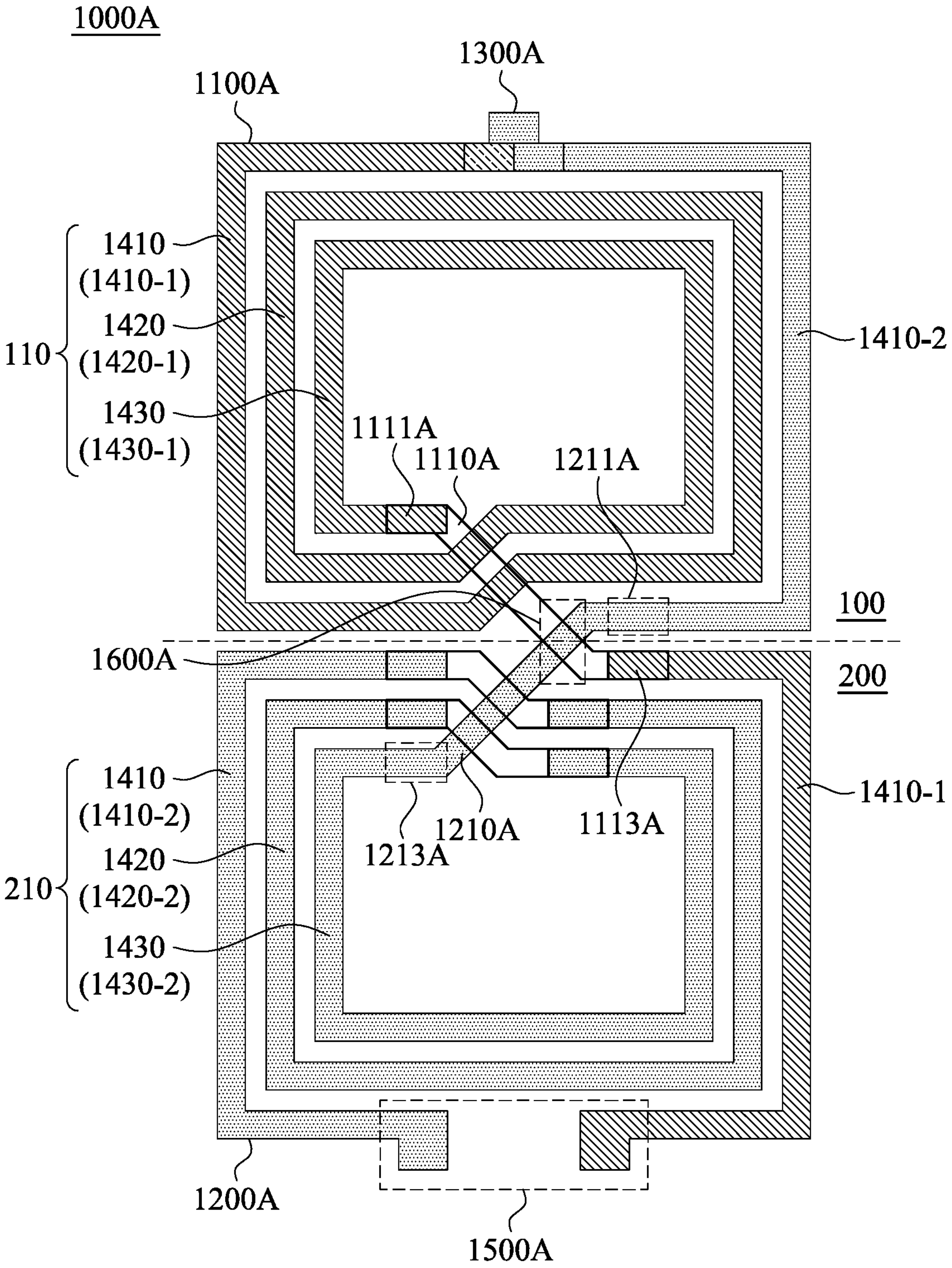
FIG. 2 depicts a schematic diagram of an inductor device according to another embodiment of the present disclosure.

FIG. 2 depicts a schematic diagram of an inductor device 1000A according to another embodiment of the present disclosure. As compared with the inductor device 1000 shown in FIG. 1, the inductor device 1000A of FIG. 2 has a different structure at a junction of a first coil 1100A and a second coil 1200A. A description is provided with reference to FIG. 2. A first connection member 1110A is coupled to a connection point 1111A of a first circle (1430-1) that is located on an innermost side among first circles 110 located at a first area 100 and a connection point 1113A of a first circle (1410-1) that is located on an outermost side among a first circle 110 located at a second area 200. A second connection member 1210A is coupled to a connection point 1211A of a second circle (1410-2) that is located on an outermost side among a second circle located at a first area 100 and a connection point 1213A of a second circle (1430-2) that is located on an innermost side among second circles 210 located at a second area 200. In one embodiment, part of the first connection member 1110A and part of the second connection member 1210A overlap. In another embodiment, an area 1600A where part of the first connection member 1110A overlaps part of the second connection member 1210A does not overlap the first and second coils 1100A, 1200A. In still another embodiment, the first connection member 1110A and the first and second coils 1100A, 1200A are located on a same layer, and the first connection member 1110A and the second connection member 1210A are located on different layers. It is noted that, in the embodiment shown in FIG. 2, elements having the reference numbers similar to those in FIG. 1 have similar structural features. To simplify matters, a description in this regard is not provided. In addition, the present disclosure is not limited to the structure shown in FIG. 2, which is merely used to illustrate one of the implementation methods of the present disclosure by taking an example.

Figure 3:
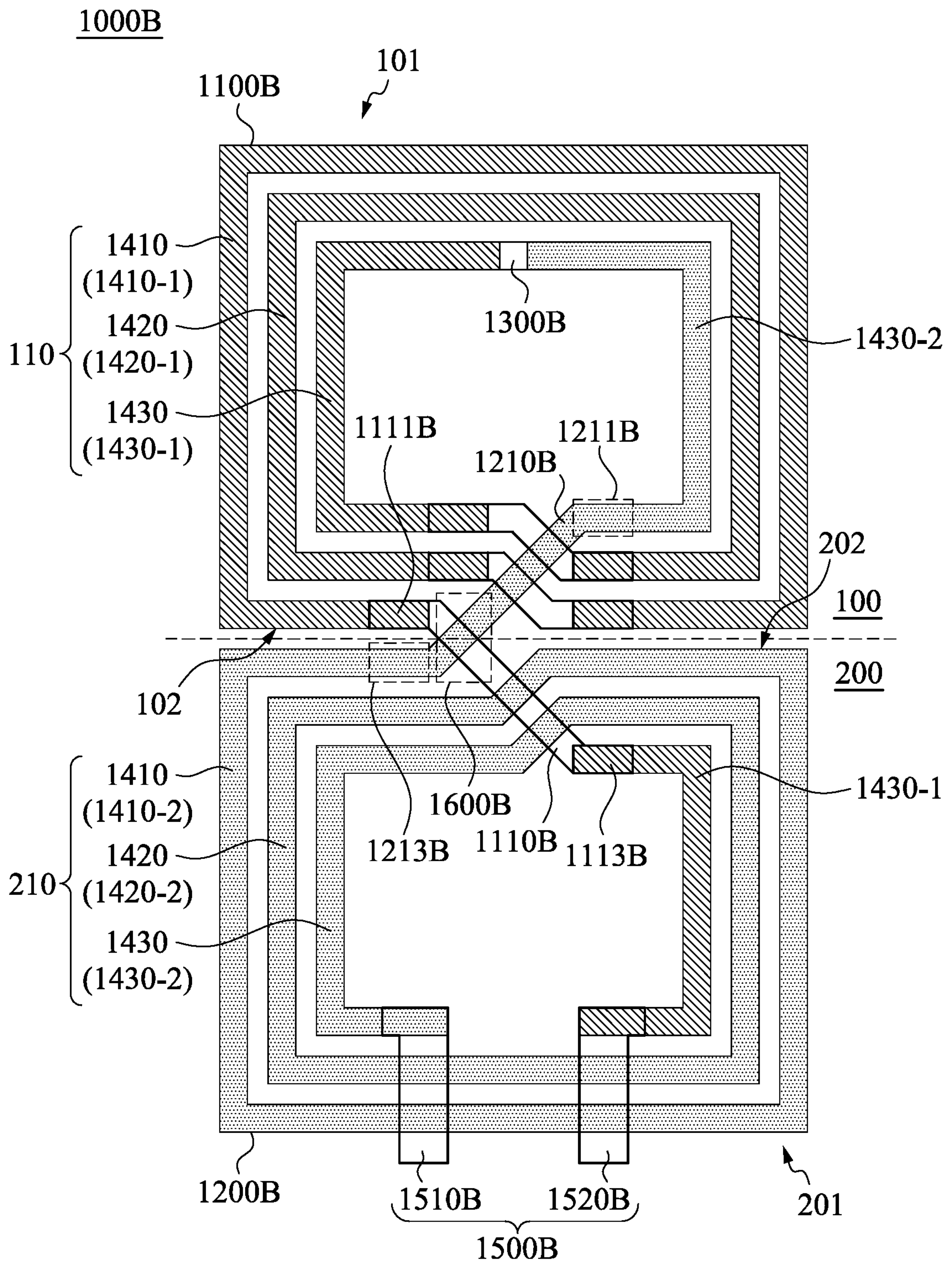
FIG. 3 depicts a schematic diagram of an inductor device according to still another embodiment of the present disclosure.

FIG. 3 depicts a schematic diagram of an inductor device 1000B according to still another embodiment of the present disclosure. As compared with the inductor device 1000 shown in FIG. 1, an input terminal 1500B of the inductor device 1000B of FIG. 3 further includes a first input member 1510B and a second input member 1520B, and a structural arrangement of the inductor device 1000B is different. A description is provided with reference to FIG. 3. The first input member 1510B and the second input member 1520B are located at a second area 200 (such as a lower half area in the figure). The first input member 1510B is coupled to a second circle (1430-2) located on an innermost side among second circles 210. The second input member 1520B is coupled to a first circle (1430-1) that is located at the second area 200. The first input member 1510B and the second input member 1520B overlap a second coil 1200B. In addition, a first connection member 1110B is coupled to a first circle (1410-1) that is located at a first area 100 and on an outermost side and a first circle (1430-1) that is located at the second area 200 and on an innermost side. A second connection member 1210B is coupled to a second circle (1430-2) that is located at the first area 100 and on an innermost side and a second circle (1410-2) that is located at the second area 200 and on an outermost side.

In one embodiment, a center-tapped terminal 1300B of the inductor device 1000B is located at the first area 100 (such as an upper half area in the figure). The center-tapped terminal 1300B is coupled to a first circle (1430-1) located on an innermost side among first circles 110. In another embodiment, part of the first connection member 1110B overlaps part of the second connection member 1210B. In another embodiment, an area 1600B where part of the first connection member 1110B overlaps part of the second connection member 1210B does not overlap the first and second coils 1100B, 1200B. In one embodiment, the first connection member 1110B and the first and second coils 1100B, 1200B are located on different layers, the second connection member 1210B and the first and second coils 1100B, 1200B are located on a same layer, and the first connection member 1110B and the second connection member 1210B are located on different layers.

In another embodiment, the first coil 1100B is wound counterclockwise from a first side 101 (such as the center-tapped terminal 1300B on an upper side) of the first area 100 to a second side 102 (such as a lower side) of the first area 100 along the third turn 1430-1, and is wound to the second turn 1420-1 on the second side 102 of the first area 100. The first coil 1100B is then wound from the second side 102 of the first area 100 to the second side 102 of the first area 100 along the second turn 1420-1, and is wound to the first turn 1410-1 on the second side 102 of the first area 100. After that, the first coil 1100B is wound from the second side 102 of the first area 100 to the second side 202 of the first area 200 along the first turn 1410-1, and is coupled to the third turn 1430-1 of the first coil 1100B located at the second area 200 through the first connection member 1110B. Additionally, the first coil 1100B is wound from a second side 202 (such as a connection point 1113B on an upper side) of the second area 200 to the second input member 1520B along the third turn 1430-1.

In addition to that, the second coil 1200B is wound clockwise from the first side 101 (such as the center-tapped terminal 1300B on the upper side) of the first area 100 to the second side 102 (such as the lower side) of the first area 100 along the third turn 1430-2, and is coupled to the first turn 1410-2 of the second coil 1200B located at the second area 200 through the second connection member 1210B. In addition, the second coil 1200B is wound from the second side 202 (such as a connection point 1213B on the upper side) of the second area 200 to the second side 202 of the second area 200 along the first turn 1410-2, and is wound to the second turn 1420-2 on the second side 202 of the second area 200. The second coil 1200B is then wound from the second side 202 of the second area 200 to the second side 202 of the second area 200 along the second turn 1420-2, and is wound to the third turn 1430-2 on the second side of 202 the second area 200. After that, the second coil 1200B is wound from the second side 202 of the second area 200 to the first input member 1510B along the third turn 1430-2. It is noted that, in the embodiment shown in FIG. 3, elements having the reference numbers similar to those in FIG. 1 have similar structural features. To simplify matters, a description in this regard is not provided. Additionally, the present disclosure is not limited to the structure shown in FIG. 3, which is merely used to illustrate one of the implementation methods of the present disclosure by taking an example.

Figure 4:
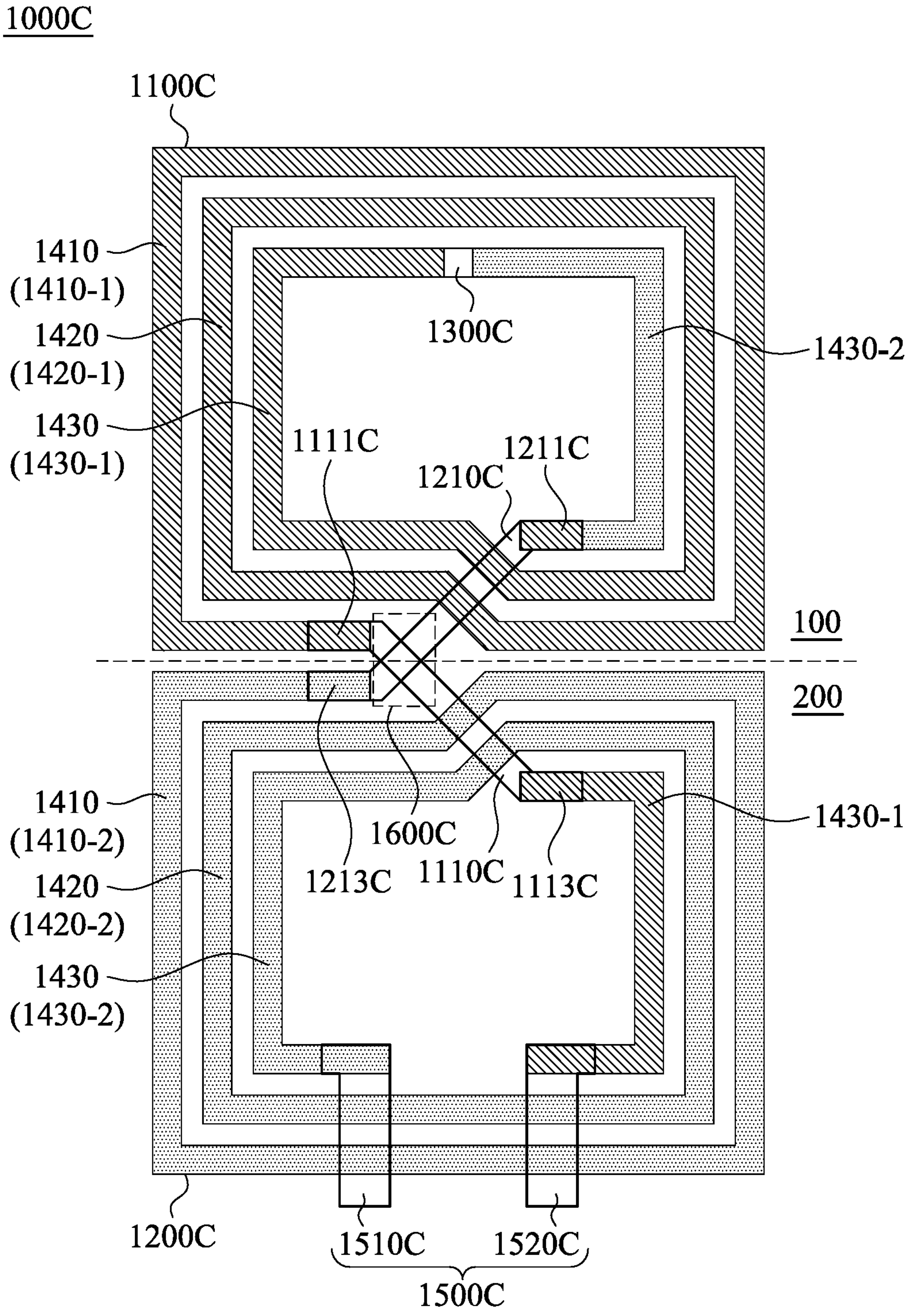
FIG. 4 depicts a schematic diagram of an inductor device according to yet another embodiment of the present disclosure.

FIG. 4 depicts a schematic diagram of an inductor device 1000C according to yet another embodiment of the present disclosure. As compared with the inductor device 10008 shown in FIG. 3, the inductor device 1000C of FIG. 4 has a different structure at a junction of a first coil 1100C and a second coil 1200C. A description is provided with reference to FIG. 4. Part of a first connection member 1110C overlaps part of a second connection member 1210C. In another embodiment, an area 1600C where part of the first connection member 1110C overlaps part of the second connection member 1210C does not overlap the first and second coils 1100C, 1200C. In one embodiment, the first connection member 1110C and the first and second coils 1100C, 1200C are located on different layers, the second connection member 1210C and the first and second coils 1100C, 1200C are located on different layers, and the first connection member 1110C and the second connection member 1210C are located on different layers. It is noted that, in the embodiment shown in FIG. 4, elements having the reference numbers similar to those in FIG. 3 have similar structural features. To simplify matters, a description in this regard is not provided. In addition, the present disclosure is not limited to the structure shown in FIG. 4, which is merely used to illustrate one of the implementation methods of the present disclosure by taking an example.

Figure 5:
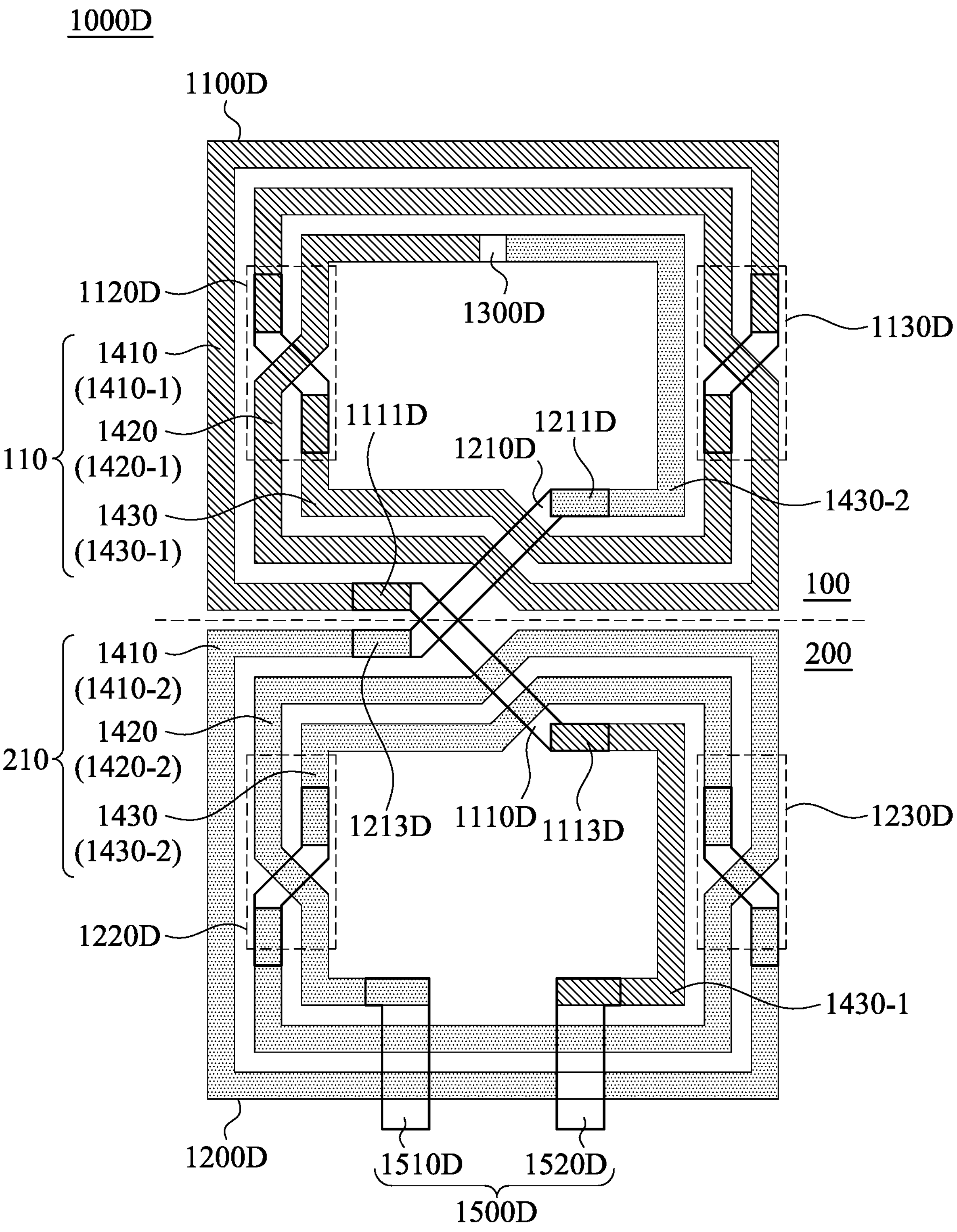
FIG. 5 depicts a schematic diagram of an inductor device according to another embodiment of the present disclosure.

FIG. 5 depicts a schematic diagram of an inductor device 1000D according to another embodiment of the present disclosure. As compared with the inductor device 1000C shown in FIG. 4, circles of the inductor device 1000D of FIG. 5 have more intersection structures. A description is provided with reference to FIG. 5. First circles 110 of the first coil 1100D are intersected and coupled in a first area 100 (such as an upper half area in the figure). For example, the first circles 110 are intersected and coupled at segments 1120D, 1130D in the first area 100. Second circles 210 of the second coil 1200D are intersected and coupled in a second area 200 (such as a lower half area in the figure). For example, the second circles 210 are intersected and coupled at segments 1220D, 1230D in the second area 200. However, the present disclosure is not limited to the structure shown in FIG. 5, which is merely used to illustrate one of the implementation methods of the present disclosure by taking an example.

As shown in FIG. 1, when a voltage is inputted from the input terminal 1500, a left-sided terminal of the input terminal 1500 receives a positive voltage, and a right-sided terminal of the input terminal 1500 receives a negative voltage. At this time, the circles presented by a dotted mesh are at a same potential (such as the positive voltage), and the circles presented by a slashed mesh are at a same potential (such as the negative voltage). A description is provided with reference to the horizontal dotted line in the lower half area of the inductor device 1000 shown in the figure. It can be seen from the horizontal dotted line that most of the coils in the second area 200 are at a same potential because the same coil (such as the second coil 1200) is mostly wound in the second area 200. Accordingly, the inductor device 1000 only generates parasitic capacitance at a position where the first turn 1410-1, 1410-2 is adjacent to the second turn 1420-1, 1420-2 on a rightmost side of the horizontal dotted line. As compared with a typical eight-shaped inductor device in which parasitic capacitances are generated at positions where most of the circles are adjacent to one another, the inductor device 1000 according to the present disclosure can indeed reduce the parasitic capacitance to improve the quality factor of the inductor device 1000. It is noted that the inductor devices 1000A to 1000D of FIG. 2 to FIG. 5 according to the present disclosure have a same structural configuration as that of the inductor device 1000 shown in FIG. 1. As a result, the inductor devices 1000A to 1000D can similarly reduce the parasitic capacitance to improve the quality factor of the inductor device 1000.

Figure 6:
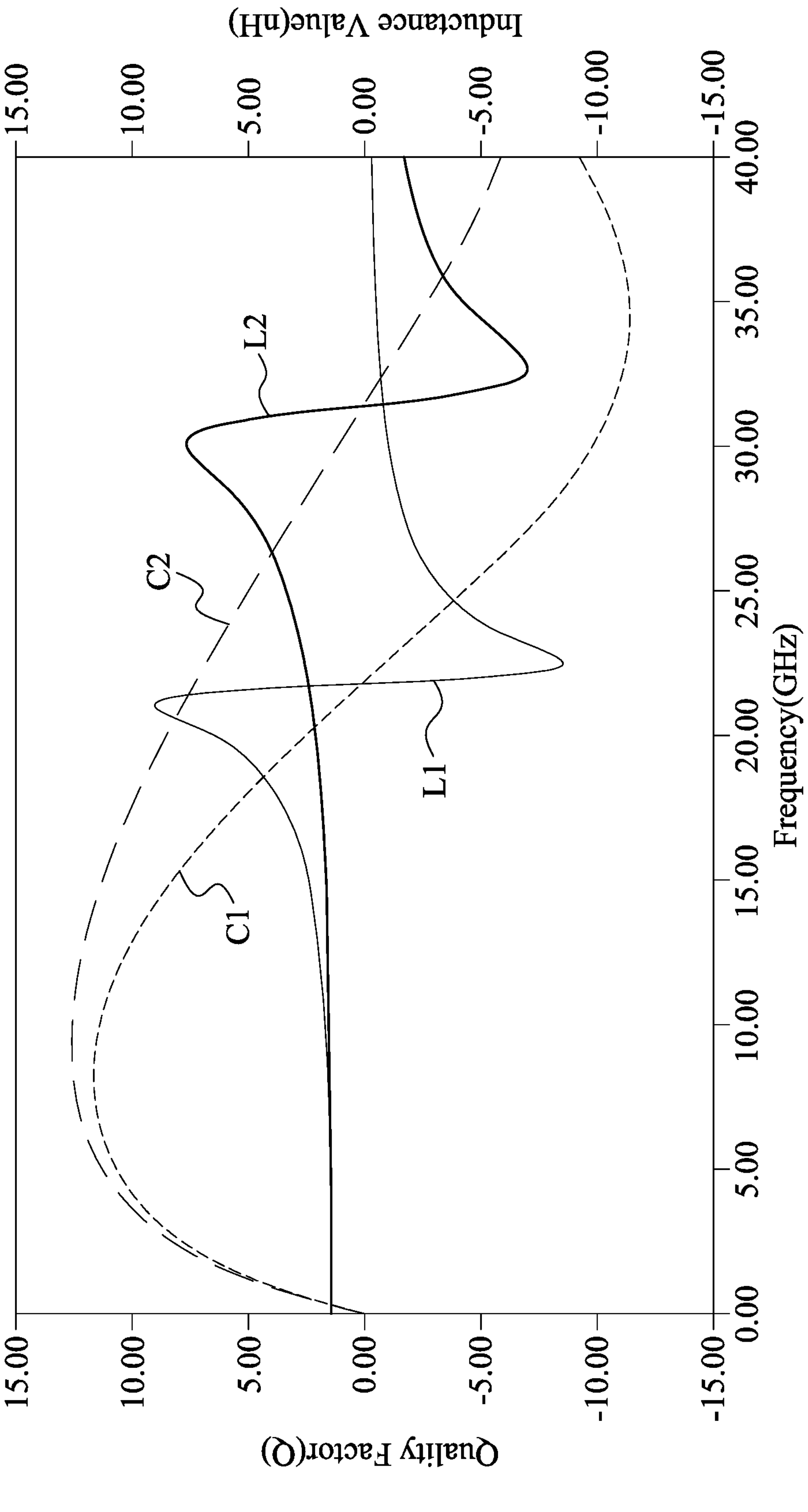
FIG. 6 depicts a schematic diagram of experimental data of an inductor device according to one embodiment of the present disclosure.

FIG. 6 depicts a schematic diagram of experimental data of the inductor devices 1000 to 1000D shown in FIG. 1 to FIG. 5 according to some embodiments of the present disclosure. As shown in the figure, curve C1 is the experimental data of quality factor of a typical eight-shaped inductor device. If the structural configuration of FIG. 1 according to the present disclosure is adopted, the experimental data of quality factor is curve C2. As can be seen from FIG. 6, the inductor device 1000 adopting the structure shown in FIG. 1 of the present disclosure has a better quality factor. For example, at a frequency of 10 GHz, the quality factor of the curve C1 is about 11, but the quality factor of the curve C2 according to the present disclosure is about 13. It is thus understood that the quality factor of the inductor device 1000 according to the present disclosure is indeed better. In addition to that, curve L1 shows the inductance value of a typical eight-shaped inductor device, and its self-resonant frequency (Fsr) is about 22 GHz. Since the frequency where the self-resonant frequency occurs is closer to the peak of the quality factor of the curve C1, it will have a greater impact on the quality factor. In addition, as can be seen from FIG. 6, the flat range before the point at which the curve L1 starts to rise is shorter, which in turn causes a smaller operable range. As for the inductance value represented by curve L2 of the inductor device 1000 having the structure shown in FIG. 1 according to the present disclosure, its self-resonant frequency is about 31 GHz. In comparing, since the frequency where the self-resonant frequency occurs is farther from the peak of the quality factor of the curve C2, its effect on the quality factor is smaller. Additionally, as can be seen from FIG. 6, the flat range before the point at which the curve L2 starts to rise is longer, so that the operable range is wider.

It can be understood from the embodiments of the present disclosure that application of the present disclosure has the following advantages. The inductor device according to the embodiments of the present disclosure can effectively reduce the parasitic capacitance between the coils of the inductor device so as to allow the inductor device to have a better quality factor (Q). In addition, the frequency where the self-resonant frequency (Fsr) of the inductor device occurs is effectively improved to move the frequency where the self-resonant frequency occurs to a higher frequency, thus reducing the influence on the quality factor.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An inductor device, comprising:

a first coil, comprising a first connection member and a plurality of first circles, wherein at least two first circles of the first circles are located at a first area, and only half of one of the other first circles is located at a second area, wherein the only half of one of the other first circles is coupled to one of the at least two first circles at the first area through the first connection member; and a second coil, comprising a second connection member and a plurality of second circles, wherein at least two second circles of the second circles are located at the second area, and only half of one of the other second circles is located at the first area, wherein the only half of one of the other second circles is coupled to one of the at least two second circles at the second area through the second connection member.

2. The inductor device of claim 1, wherein the first connection member is coupled to the one of the at least two first circles on an innermost side among the first circles that are located at the first area and the only half of one of the other first circles on an outermost side among the first circles that are located at the second area, wherein the second connection member is coupled to the only half of one of the other second circles on an outermost side among the second circles that are located at the first area and the one of the at least two second circles on an innermost side among the second circles that are located at the second area.

3. The inductor device of claim 1, wherein part of the first connection member overlaps part of the second connection member.

4. The inductor device of claim 1, wherein the first connection member and the second connection member are located on different layers.

5. The inductor device of claim 1, wherein the first coil and the second coil are located on a same layer.

6. The inductor device of claim 5, wherein the first connection member is located on a first layer, the first coil and the second coil are located on a second layer, and the second connection member is located on a third layer, wherein the first layer, the second layer, and the third layer are sequentially stacked.

7. The inductor device of claim 5, wherein the first connection member is located on a first layer, the second connection member is located on a second layer, and the first coil and the second coil are located on a third layer, wherein the first layer, the second layer, and the third layer are sequentially stacked.

8. The inductor device of claim 5, wherein part of the first connection member and part of the second connection member overlap the first coil and the second coil.

9. The inductor device of claim 1, wherein the inductor device further comprises an input terminal, wherein the input terminal is located at the second area.

10. The inductor device of claim 9, wherein the input terminal is coupled to the only half of one of the other first circles on an outermost side among the first circles and the one of the at least two second circles on an outermost side among the second circles.

11. The inductor device of claim 10, wherein the inductor device further comprises a center-tapped terminal, wherein the center-tapped terminal is located at the first area.

12. The inductor device of claim 11, wherein the center-tapped terminal is coupled to the one of the at least two first circles on the outermost side among the first circles and the only half of one of the other second circles on the outermost side among the second circles.

13. The inductor device of claim 12, wherein the first coil and the second coil are collectively wound into a first turn, a second turn, and a third turn, wherein the first turn, the second turn, and the third turn are sequentially arranged from an outside to an inside, wherein the first coil is wound from a first side of the first area to a second side of the first area along the first turn, and is wound from the second side of the first area back to the second side of the first area along the second turn, and is wound from the second side of the first area back to the second side of the first area along the third turn to couple to the first turn of the first coil located at the second area through the first connection member, wherein the first coil is wound from a second side of the second area to a first side of the second area along the first turn, and wherein the second coil is wound from the first side of the second area to the second side of the second area along the first turn, and is wound from the second side of the second area back to the second side of the second area along the second turn, and is wound from the second side of the second area back to the second side of the second area along the third turn to couple to the first turn of the second coil located at the first area through the second connection member, wherein the second coil is wound from the second side of the first area to the first side of the first area along the first turn.

14. The inductor device of claim 1, wherein the inductor device further comprises an input terminal, the input terminal comprises a first input member and a second input member, wherein the first input member and the second input member are located at the second area.

* * * * *